United States Patent
Sapienza (10) Patent No.: US 10,960,554 B2
(45) Date of Patent: Mar. 30, 2021

(54) FUNNEL RETRIEVER

(71) Applicant: Michael Sapienza, North Ridgeville, OH (US)

(72) Inventor: Michael Sapienza, North Ridgeville, OH (US)

( * ) Notice: Subject to any disclaimer, the term of this patent is extended or adjusted under 35 U.S.C. 154(b) by 0 days.

(21) Appl. No.: 16/273,468

(22) Filed: Feb. 12, 2019

(65) Prior Publication Data

US 2019/0248022 A1 Aug. 15, 2019

Related U.S. Application Data

(60) Provisional application No. 62/629,248, filed on Feb. 12, 2018.

(51) Int. Cl.
*B25J 15/00* (2006.01)

(52) U.S. Cl.
CPC ....... *B25J 15/0014* (2013.01); *B25J 15/0019* (2013.01); *B25J 15/0028* (2013.01)

(58) Field of Classification Search
CPC .......... B25J 15/0014; B25J 15/0028; B25J 15/0019; B25J 1/04; E01H 2001/1293
USPC .................................................. 294/1.4, 1.5
See application file for complete search history.

(56) References Cited

U.S. PATENT DOCUMENTS

| | | | | |
|---|---|---|---|---|
| 4,741,566 A * | 5/1988 | Byung-Do | ........... | A01K 23/005 15/104.8 |
| 5,320,393 A * | 6/1994 | Cortinas | ............... | E01H 1/1206 15/257.6 |
| 5,667,264 A * | 9/1997 | Tanahara | ............... | E01H 1/1206 15/257.6 |
| 5,671,959 A * | 9/1997 | Tsou | ..................... | E01H 1/1206 15/257.6 |
| 6,032,995 A * | 3/2000 | Barbaro | ................ | E01H 1/1206 15/257.3 |
| 8,292,339 B1 * | 10/2012 | Auseklis | ............... | E01H 1/1206 294/1.4 |
| 2012/0274089 A1 * | 11/2012 | Green | .................. | E01H 1/1206 294/1.4 |

* cited by examiner

*Primary Examiner* — Stephen A Vu
(74) *Attorney, Agent, or Firm* — Rankin, Hill & Clark LLP (57) ABSTRACT

A retriever for retrieving objects, including an elongated arm; a container on one end of the arm having an opening providing access to an interior of the container; and an actuator on the other end of the arm. Operation of the actuator causes movement of a scraper plate between an open position and a closed position. When in the open position, the scraper plate is spaced from the opening. When in the closed position, the scraper plate contacts the container at the opening. If an object is located in the space between the scraper plate and the opening, then movement of the scraper plate between the open and closed positions pushes the object into the interior of the container. The object can then slide through a channel along the arm, and be retrieved by a user from an opening in the channel near the trigger.

20 Claims, 7 Drawing Sheets

FUNNEL RETRIEVER

CROSS REFERENCE TO RELATED APPLICATION

This application claims priority to U.S. Provisional Patent Application Ser. No. 62/629,248, filed Feb. 12, 2018, which is expressly incorporated herein by reference.

BACKGROUND

Retrievers and grabbers are operated by a user to assist in grasping objects from a location that is difficult to reach, such as from the ground. Such grabbers usually include an extension arm, a one or more movable fingers on a working end of the extension arm for grabbing an object, and a trigger on the other end of the extension arm that is operated by the user to move the fingers so as to grab the object from the location where it is found, usually the ground or floor.

These grabbers are limited in several respects. First, the fingers on the grabber can pick up objects only of a certain size and only of a certain shape. That is, the fingers cannot pick up very small objects, and cannot pick up two-dimensional objects, such as small pieces of paper. As such, the grabbers are limited to grasping objects having a three-dimensional shape and a size large enough to be grasped by the fingers of the grabber.

Second, the grabbers also do not easily deliver the grasped object directly to a user's hand. Instead, after the object is grasped, the grabber has to be turned around while the user is squeezing the trigger with one hand, and then the object has to be released into the user's other hand; or the object has to be released on to a table and then retrieved by the user. These and other deficiencies limit the use of these grabbers and make them difficult to use.

BRIEF DESCRIPTION

According to one aspect, a retriever includes an arm having a first end and a second end opposite from the first. A container is arranged at the first end of the arm and the container has an opening providing access to an interior of the container. A scraper plate is movable between an open position and a closed position. The scraper plate is spaced from the opening when in the open position, and contacts the container at the opening when in the closed position. An actuator is arranged at a second end of the arm and is operatively connected to the scraper plate such that when the actuator is operated, the scraper plate is moved between the open position and the closed position.

According to another aspect, a funnel retriever includes an elongated arm having a first end and a second end opposite from the first end. A funnel is arranged at the first end of the arm. The funnel has a first opening and a second opening that provide access to an interior of the funnel. The first opening is arranged on a side of the funnel opposite from the first end of the arm, and the second opening is arranged on the elongated arm. The funnel retriever includes a scraper plate that is movable between an open position and a closed position. The scraper plate is spaced from the first opening when in the open position, and contacts the funnel at the first opening when in the closed position. An actuator is arranged at a second end of the arm and is operatively connected to the scraper plate such that when the actuator is operated, the scraper plate is moved between the open position and the closed position.

DETAILED DESCRIPTION

The present subject matter relates to a funnel retriever that may be operated by a user for retrieving objects, for example, from the ground of floor, and delivering them to a hand of the user.

Referring to the figures, a funnel retriever 2 includes an elongated arm 4 having a first end 6 and an opposite second end 8. The arm 4 may be made of any material including for example, wood, plastic, or metal.

A container 10 may be arranged at the first end 6 of the arm 4. The container 10 may have different sizes and shapes, and is generally used to temporarily house the retrieved object. The container 10 includes a first opening 12 and a second opening 14 providing access to an interior 16 of the container 10. The first opening 12 may be on a side of the container 10 that is opposite from the first end 6 of the arm 4, i.e. the first opening 12 may be directed away from the first end 6 of the arm 4. The second opening 14 may be arranged on a side of the container 10 facing the first end 6 of the arm 4, i.e. the second opening 14 may be directed toward the first end 6 of the arm 4.

The container 10 may include four walls 20, 22, 24, 26 that define the interior 16. The bottom wall 26 may include a front bottom edge 28 at the first opening 12 that is straight. The bottom edge 28 of the first opening 12 being straight, may allow the container 10 to sit flush against a flat surface, such as the ground, when retrieving an object.

The container 10 may be a funnel having a square or rectangular cross-sectional shape as shown in the figures for example. However, this is not required, and the container 10 may have other shapes and sizes. The funnel-shaped container 10 may be arranged such that the first opening 12 is larger than the second opening 14, and the two side walls 22, 24 converge as the side walls 22, 24 go from the first opening 12 to the second opening 14, and the top and bottom walls 20, 26 are trapezoids. The top wall 20 may be transparent as depicted in the figures, so as to allow a user to see a retrieved object in the interior 16 of the container 10.

The retriever 2 may include a scraper plate 30 arranged at the first end 6 of the arm 4 and may be movable between an open position (FIGS. 1, 2, 4) and a closed position (FIG. 3) to thereby move an object from the ground for example, into the interior 16 of the container 10. The scraper plate 30 is spaced from the first opening 12 when in the open position, and the scraper plate 30 contacts the container 10 at the first opening 12 when in the closed position. The scraper plate 30 may be sized to have an area that is within 10% of the area of the first opening 12, e.g. equal to or larger than the size of the first opening 12. The scraper plate 30 may have a square or rectangular shape to match that of the first opening 12.

The scraper plate 30 may include a bend 31 along its width W that separates the scraper plate 30 into a bottom portion 32 and a top portion 34. A smaller angle θ of two angles between the bottom portion 32 and the top portion 34 may be with the range of 5° to 90°, or 45°, for example. Besides the bend 31, the scraper plate 30 may otherwise be flat. Like the bottom edge 28 of the container 10, a bottom edge 36 of the bottom portion 32 may be straight in order to scape along a flat surface (e.g. the ground or floor) upon which an object to be retrieved is lying. When the scraper plate 30 is in the closed position, the bottom edge 36 of the scraper plate 30 may contact the bottom edge 28 of the container 10, e.g. the entire bottom edge 36 of the scraper plate 30 may contact the bottom edge 28 of the container 10, or the bottom edge of the scraper plate 30 may contact the entire bottom edge 28 of the container 10.

The scraper plate 30 may be moved from the open position to the closed position by operation of an actuator 38, which may be arranged at the second end 8 of the arm 4. The actuator 38 may be operatively connected to the scraper plate 30 such that when the actuator 38 is operated by a user, the scraper plate 30 is moved between the open position and the closed position. If an object is located in the space between the scraper plate 30 and the first opening 12, then movement of the scraper plate 30 between the open and closed positions pushes the object into the interior 16 of the container 10. The actuator 38 may include a trigger, or other mechanism, for operation by a user. A handle 41 may be included at the second end 8 of the arm 4 near the actuator 38 for allowing a user to grasp and operate the retriever 2, for example with one hand holding the handle 41 and with a finger of the same hand operating the trigger.

Figure 1:
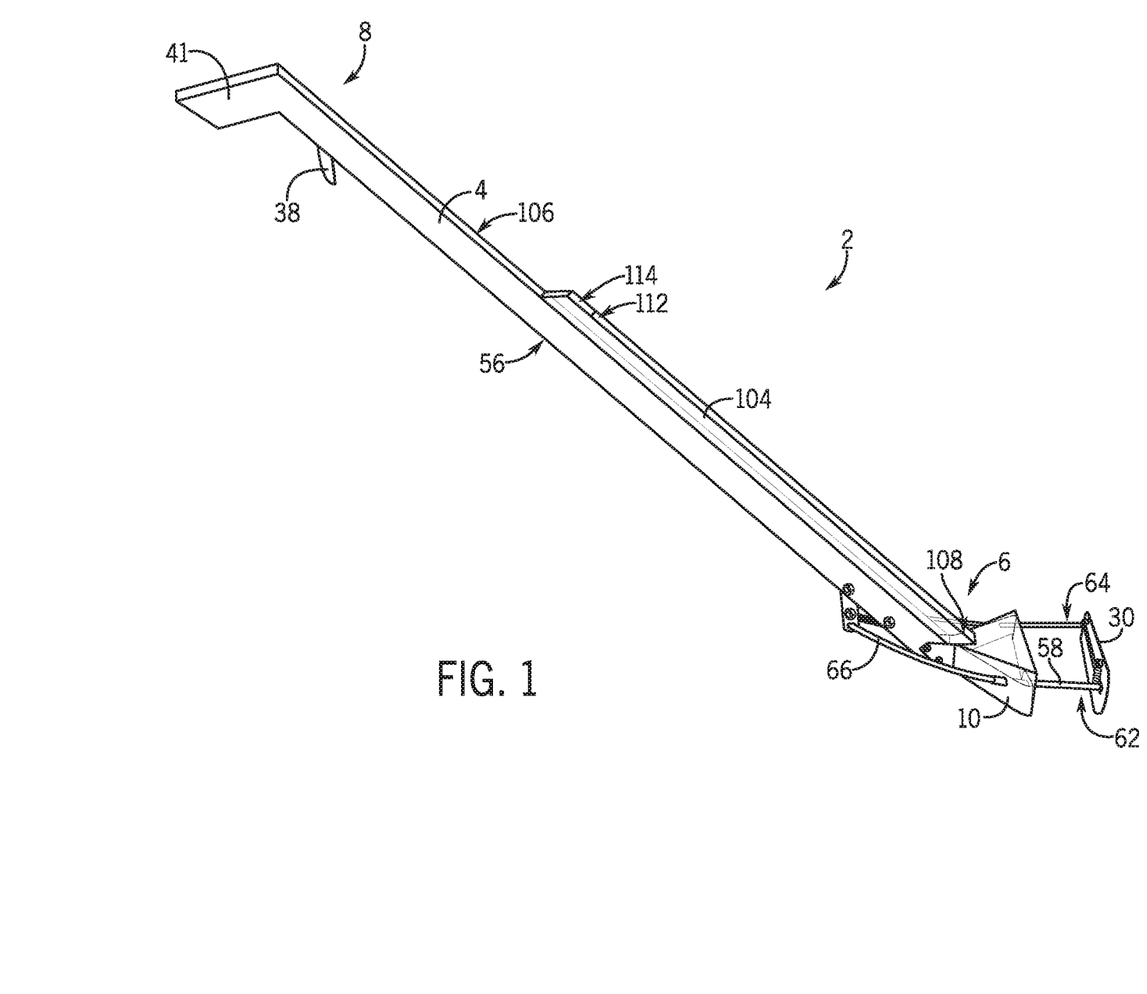
FIG. 1 is a perspective view of a retriever according to the present subject matter.
Figure 2A:
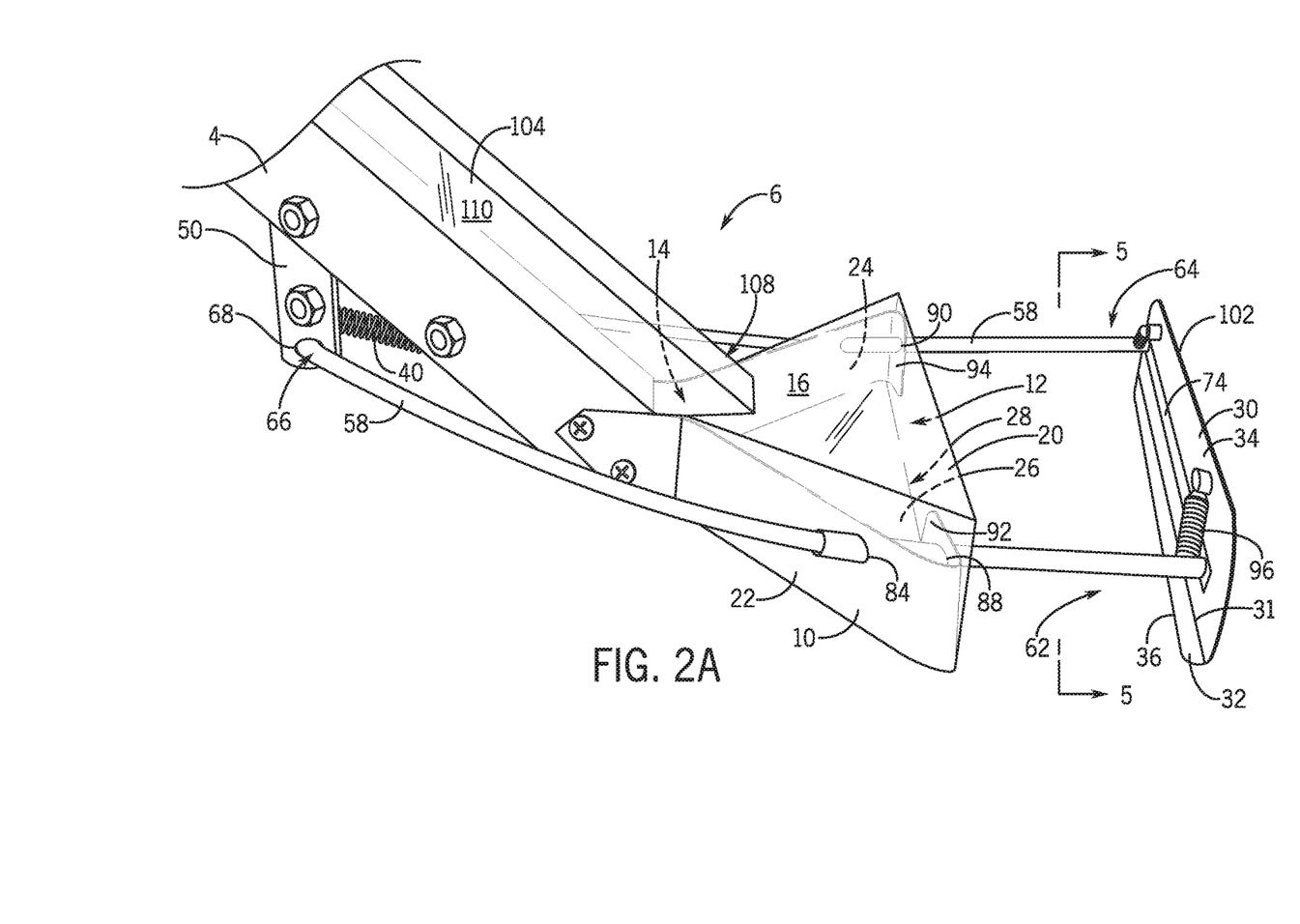
FIG. 2A is a detailed perspective view of a portion of the retriever of FIG. 1.
Figure 2B:
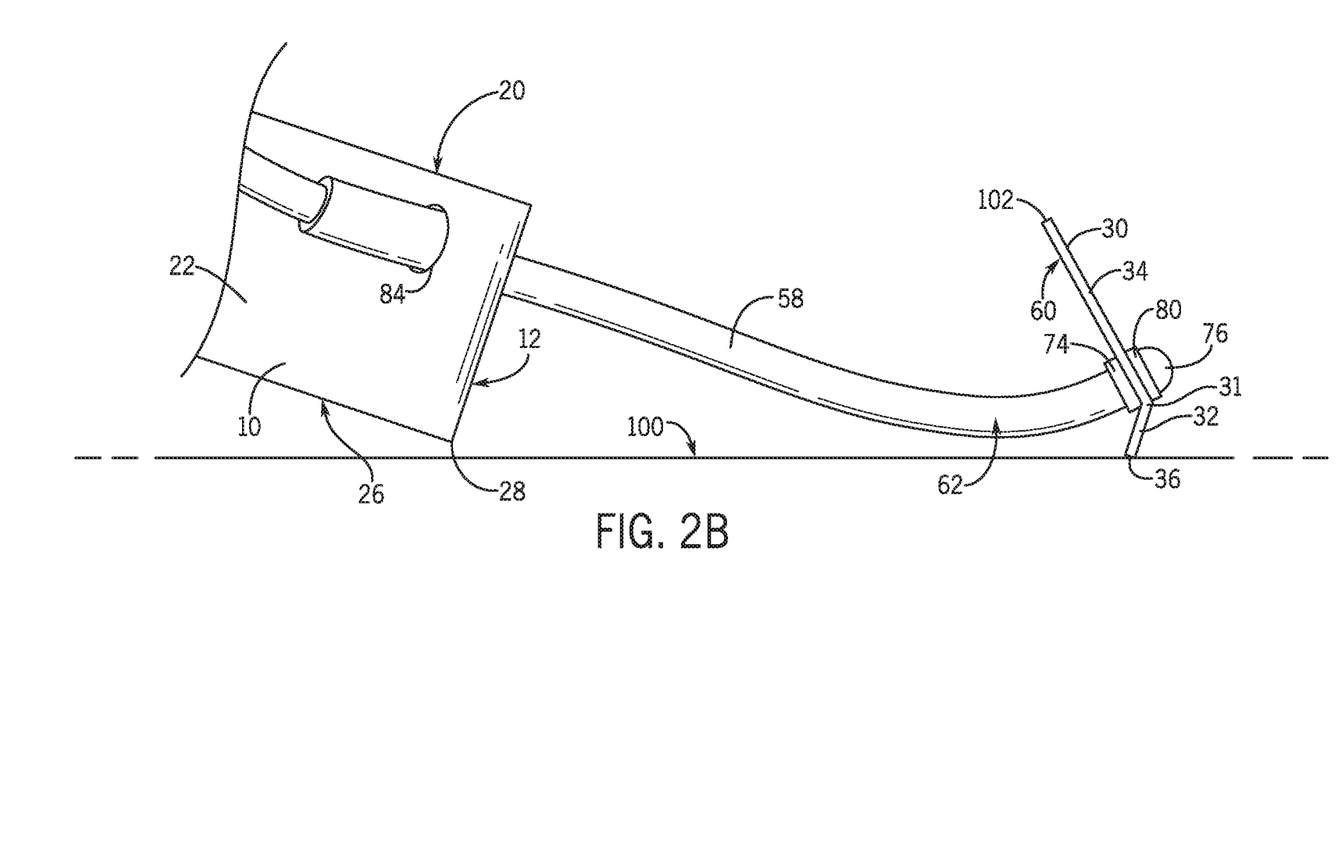
FIG. 2B is a side view of a portion of the retriever of FIG. 2A.
Figure 3A:
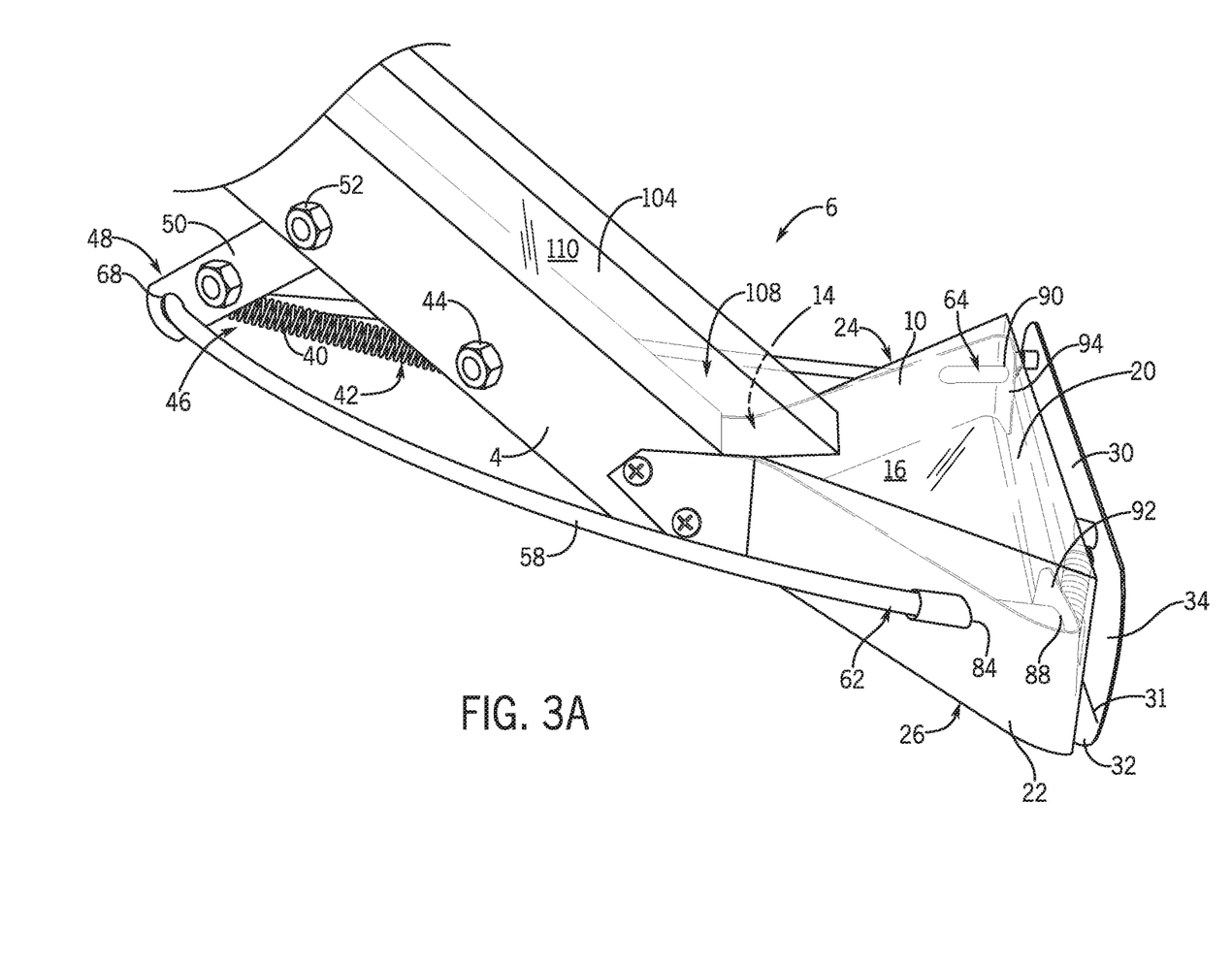
FIG. 3A is a detailed perspective view of a portion of the retriever of FIG. 1 with a scraper plate being in a closed position.
Figure 3B:
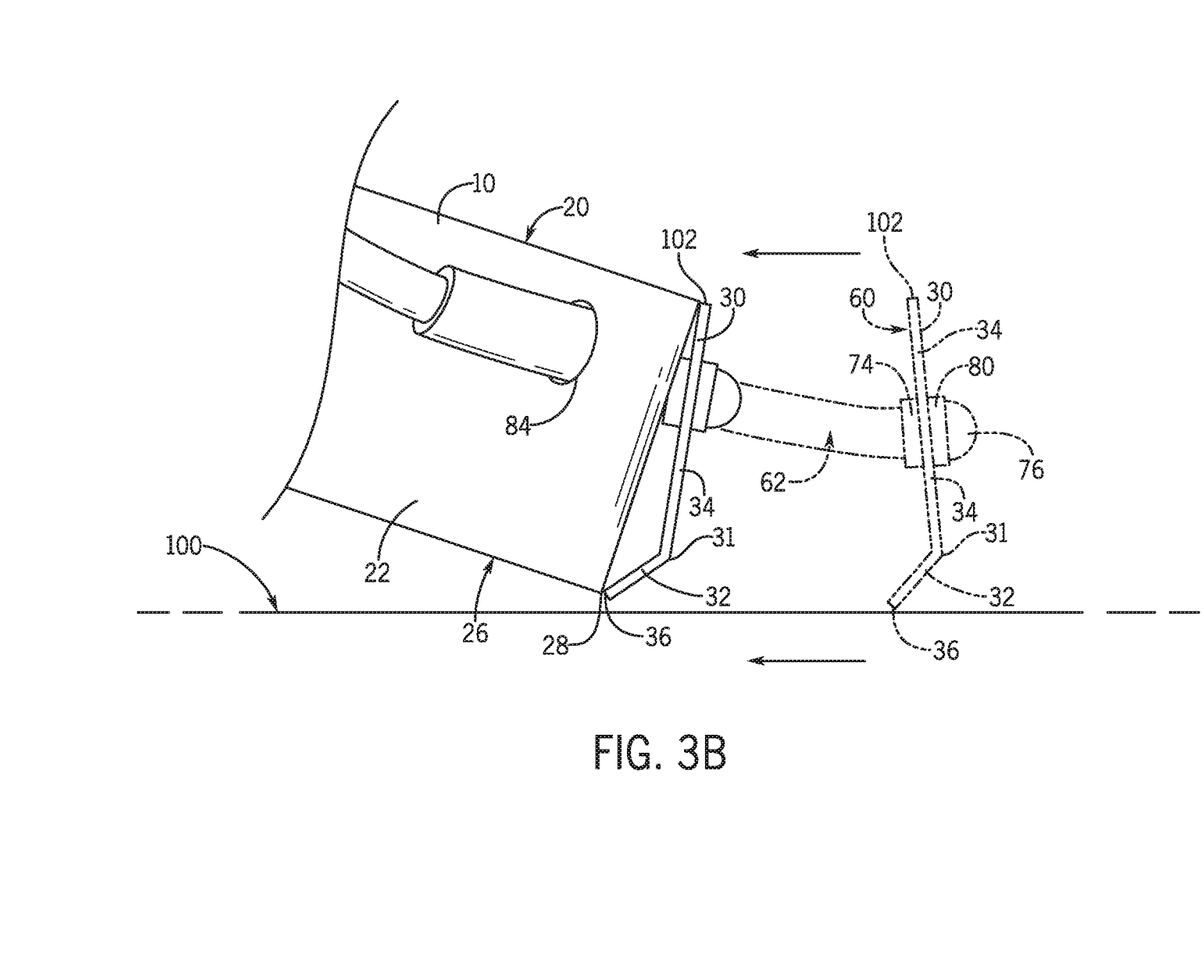
FIG. 3B is a side view of a portion of the retriever of FIG. 3A.
Figure 4:
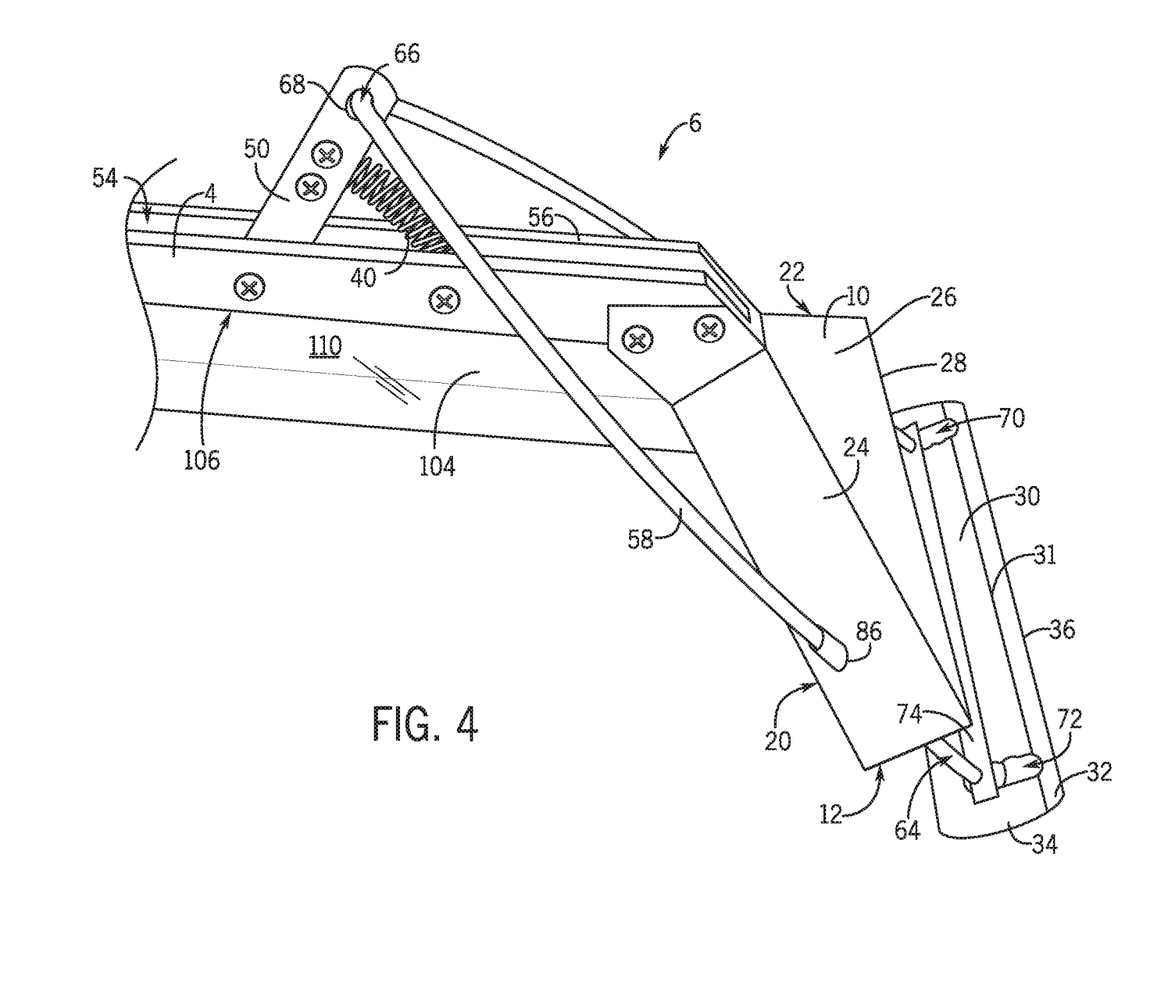
FIG. 4 is a bottom perspective view of the retriever of FIG. 1.

The actuator 38 may be biased toward a first position (FIG. 1), such that the scraper plate 30 is urged toward the open position (FIGS. 1, 2, 4). Alternatively, the actuator 38 may be biased toward a second position, such that the scraper plate 30 is urged toward the closed position (FIG. 3); or the actuator 38 may not be biased to either of the first or second positions.

A spring 40 may be operatively connected to the actuator 38 to urge the actuator 38 towards the first position (FIG. 1) or second position. One end 42 of the spring 40 may be mounted to the arm 4 by a connector 44, and an opposite end 46 to one end 48 of a movable lever 50. The lever 50 may also be connected to the arm 4 at a connector 52, and operatively connected to the actuator 38 by a string, rod, or other mechanism (not shown) to urge the actuator 38 toward the first position or the second position as the case may be. The string, rod or other mechanism connecting the lever 50 to the actuator 38 may be arranged in a groove 54 on an underside 56 of the arm 4.

The lever 50 is operatively connected, e.g. by a rod 58, to the scraper plate 30 to move the scraper plate 30 relative to the container 10 and between the open and closed positions. Alternatively, two rods can be used instead of the one rod 58.

The rod 58 may be flexible but inelastic. The rod 58 may be connected to the scraper plate 30 and may extend from a flat surface 60 of the scraper plate 30, towards the first opening 12, through the container 10, and be operatively connected to the actuator 38 such that when the actuator 38 is operated, the rod 58 moves the scraper plate 30 between the open position and the closed position.

A first end 62 and a second opposite end 64 of the rod 58 may be connected to the scraper plate 30, with a middle 66 of the rod 58 passing through a hole 68 in the lever 50. The first end 62 of the rod 58 may pass through a first slot 70 in the scraper plate 30 and may be movable along a length (e.g. a vertical dimension) of the first slot 70. The second end 64 of the rod 58 may pass through a second slot 72 in the scraper plate 30 and the second end 64 may be movable along a length (e.g. vertical dimension) of the second slot 72. The first end 62 of the rod 58 may be held is a spaced apart relationship from the second end 64 of the rod 58 by a slide plate 74. The slide plate 74 may be arranged on one side of the scraper plate 30 and may contact or be spaced from the scraper plate 30. As seen in the figures, the slide plate 74 is arranged on a side of the scraper plate 30 closest to the container 10, but is should be understood that the slide plate 74 can be arranged on a side of the scraper plate 30 furthest from the container 10. The slide plate 74 may include two holes through which the two ends 62, 64 of the rod 58 pass. The slide plate 74 may hold the two ends 62, 64 of the rod 58 a predetermined distance apart such that the two ends 62, 64 of the rod 58 are spaced apart and are centered in the respective slots 70, 72. This may allow the two ends 62, 64 to more easily move up and down in the respective slots 70, 72 excessively rubbing against the side edges of the slots 70, 72 and causing friction between the two ends 62, 64 and the side edges of the slots 70, 72.

The two ends 62, 64 of the rod 58 may be secured axially in the respective slots 70, 72 of the scraper plate 30. That is, the two ends 62, 64 of the rod 58 may be secured from being pulled through the respective slots 70, 72, for example by respective fasteners (76 only one shown) attached to the two terminal ends of the rod 58. These fasteners (76 only one shown) may hold washers 80, 82 on the two ends 62, 64 of the rod 58, which washers 80, 82 may prevent the two ends 62, 64 of the rod 58 from moving axially through the slots 70, 72. However, the fasteners 76, 78 may be secured on the terminal ends of the rod 58 in such a way as to also allow the two ends 62, 64 of the rod 58 to move along the lengths of the respective slots 70, 72.

Figure 5:
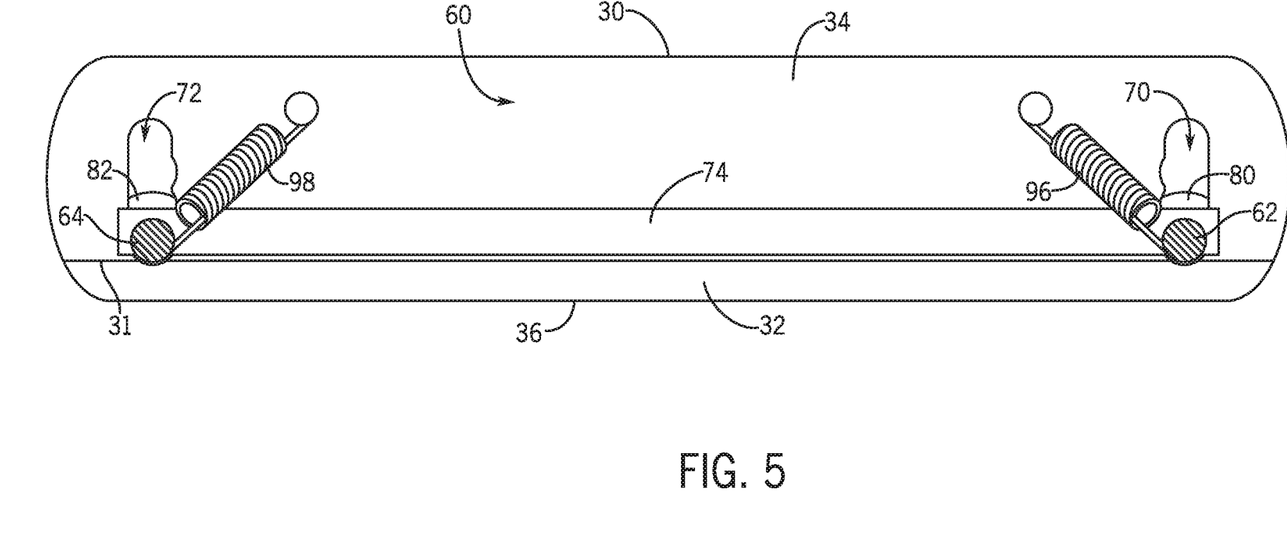
FIG. 5 is a side elevation view of a scraper plate according to the present subject matter.

Two biasing members 96, 98 (e.g. springs) may urge the respective ends 62, 64 of the rod 58 toward a top of the respective slots 70, 72 (FIG. 6), but yet allow the ends 62, 64 of the rod 58 to move towards a bottom of the respective slots 70, 72 (FIG. 5).

The rod 58 may also pass through two sets of holes in the container 10. As shown in the figures, the rod may pass through holes 84, 86 in the side walls 22, 24 of the container 10, and may pass through holes 88, 90 in respective front tabs 92, 94 extending from ends of the respective side walls 22, 24 (i.e. edges of the first opening 12) and into the first opening 12. The rod 58 may be able to move axially through the two sets of holes 84, 86, 88, 90 and may also be moveable in an up and down direction only in the second set of holes 88, 90, which may be oval shaped to allow for this up and down movement of the rod 58.

The connections between the scraper plate 30 and the two ends 62, 64 of the rod 58 may allow the scraper plate 30 to partially rotate about an axis A of the scraper plate, the axis A being parallel to the width W of the scraper plate 30 and passing through the two ends 62, 64 of the rod 58. Such partial rotation of the scraper plate 30 about axis A allows for a sweeping motion of the scraper plate 30 as the scraper plate 30 is moved into the closed position. This can be seen between FIG. 2B and FIG. 3B, and in FIG. 3B between the dotted and solid depictions of the scraper plate 30. As the scraper plate 30 is in the open position (FIG. 3B), the ends 62, 64 of the rod 58 are at a bottom of the respective slots 70, 72 and near a bottom of the scraper plate 30 due to the scraper plate 30 being pushed down against a surface 100 and causing a bend in the rod 58. The force exerted on the scraper plate 30 by the bent rod 58 overcomes the urging produced by the biasing members 96, 98, thus causing the ends 62, 64 of the rod 58 to move to the bottom of the respective slots 70, 72. Due to the force exerted on the scraper plate 30 pushing against the surface 100, the rod 58 may bend as shown in FIG. 2B. The bending of the flexible rod 58 may supply a constant pressure on the scraper plate 30 such that the bottom edge 36 of the scraper plate 30 maintains contact with the surface 100 during the entire movement of the scraper plate 30 between the open position and the closed position. In this arrangement shown in FIG. 2B, the top edge 102 of the scraper plate 30 may be arranged closer the first opening 12 than the bottom edge 36.

As the scraper plate 30 is pulled toward the container 10, the bottom edge 36 scrapes along the surface 100 to thereby engage any object on the surface 100 that is located between the scraper plate 30 and the first opening 12. The scraper plate 30 may pull the object along the surface 100 and toward the container 10. As the scraper plate 30 is pulled further towards the container 10, the rod 58 can no longer bend because the ends 62, 64 of the rod 58 are approaching the holes 84, 86, 88, 90 in the container 10. Thus, as the length of the rod 58 between the holes 84, 86, 88, 90 and the scraper plate 30 is shortened, the rod 58 is urged to straighten out in the location between the holes 84, 86, 88, 90 and the scraper plate 30. Because the rod 58 is being straightened out and being pulled axially through the holes 84, 86, 88, 90, the ends 62, 64 of the rod 58 are urged from the bottom of the respective slots 70, 72, and up toward the top of the slots 70, 72.

This movement of the ends 62, 64 of the rod 58 up toward the top of the slots 70, 72 causes the scraper plate 30 to experience a sweeping motion, where the scraper plate 30 partially rotates about the axis A such that the bottom edge 36 of the scraper plate 30 moves more quickly toward the container 10 than does the top edge 102 (See FIG. 3). Such sweeping motion may commence somewhere between a fully opened position and the closed position, and may cease when the scraper plate 30 reaches the close position. When in the closed position (solid drawing in FIG. 3B), the ends 62, 64 of the rod 58 may be at the top of the slots 70, 72, and the top edge 102 and the bottom edge 36 of the scraper plate 30 may be contacting the container 10.

If the scraper plate 30 was engaging an object during this movement, the object may be pushed by the scraper plate 30 through the first opening 12 and into the interior 16 of the container 10. The sweeping motion of the scraper plate 30 against the surface 100 may allow the retriever 2 to retrieve various objects that cannot be grabbed by conventional grabbers, such as very small items such as paper clips or pills, or two-dimensional items such as paper. The bend 31 in the scraper plate 30 may also assist in sweeping the objects into the interior 16 of the container 10 and up over the bottom edge 36 of the first opening 12, as the bend 31 may provide more friction against the surface 100 during scraping and more lifting action to the object.

The retriever 2 may include a channel 104 extending along the length L1 of the arm 4. The channel 104 may be arranged on a topside 106 of the arm 4. A first end 108 of the channel 104 may be connected to the container 10 such that an interior 110 of the channel 104 connects to the interior 16 of the container 10 at the second opening 14. The channel may be enclosed, other than at a second end 112 thereof, where the channel 104 includes a retrieval opening 114 arranged on the arm 4 that provides access to the interior 110 of the channel 104. In this sense, the channel 104 may be considered part the container 10 when the container 10 is in the shape of a funnel, where the channel 104 has a smaller cross section than that of the first opening 12 of the funnel-shaped container 10. As such, the retrieval opening 114 in the channel 104 may be considered to be a second opening of the funnel-shaped container 10. The top and sides of the channel 104 may be transparent as depicted in the figures, so as to allow a user to see a retrieved object in the interior 110 of the channel 104.

An object retrieved from the surface 100 and contained in the interior 16 of the container 10, may be delivered to the hand of a user by angling the retriever 2 such that the object slides from the interior 16 of the container 10, through the interior 110 of the channel 104 and to the retrieval opening 114, wherefrom the object can be secured in the user's hand that is not grasping the handle 41. The object may be deposited in the user's hand by turning over the retriever 2 such that the object falls out of the retrieval opening 114, which may be arranged in a top wall of the channel 104. As such, the retriever 2 is operable to deliver the retrieved object directly to the hand of the user, without having to turn the retriever 2 around to access the objection through the first opening 12 and from the interior 16 of the container 10, and without having to first remove the object from the interior 16 through the first opening 12 and deposit the object on another surface, such as a table.

The dimensions (i.e. length, width, height) of the retriever 2 and its individual components, may be determined, among other considerations, according to a desired use of the funnel retriever 2, the type or size of objects to be retrieved, and/or to the size or abilities of the user of the funnel retriever 2.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A retriever configured to retrieve an object from a surface, the retriever including:
   an arm having a first end and a second end opposite from the first end;
   a container arranged at the first end of the arm and having an opening providing access to an interior of the container, the opening being configured to allow the object to enter the interior, the interior being configured to house the object;
   a scraper plate movable between an open position and a closed position, the scraper plate being spaced from the opening and not contacting the container when in the open position, and the scraper plate contacting the container at the opening when in the closed position, the scraper plate being configured to contact the surface and to pull the object through the opening and into the interior when moved from the open position to the closed position;
   an actuator arranged at the second end of the arm; and
   flexible rods operatively connecting the actuator to the scraper plate such that when the actuator is operated, the rods move the scraper plate between the open position and the closed position.

2. The retriever according to claim 1, wherein when the scraper plate is in the closed position, a flat surface of the scraper plate closes off the opening.

3. The retriever according to claim 2, wherein:
the container includes a straight bottom edge at the opening; and
the scraper plate contacts the straight bottom edge of the container when the scraper plate is in the closed position.

4. The retriever according to claim 3, wherein the container is a funnel having a square or rectangular cross-sectional shape taken in a plane parallel to the opening, and the rectangular cross-sectional shape decreases in area going away from the opening.

5. The retriever according to claim 1, wherein:
the rods are operatively connected to the scraper plate and extends from a flat surface of the scraper plate, towards the opening, through the container, and are operatively connected to the actuator.

6. The retriever according to claim 5, wherein:
the rods include a first rod and a second rod;
an end of the first rod is operatively connected to a first slot in the scraper plate and the end of the first rod is movable along a length of the first slot; and
an end of the second rod is operatively connected to a second slot in the scraper plate and the end of the second rod is movable along a length of the second slot.

7. The retriever according to claim 6, wherein:
the scraper plate is partially rotatable about an axis; and
the axis is parallel a width of the scraper plate.

8. The retriever according to claim 6, wherein:
the end of the first rod is urged toward a top of the first slot by a first biasing member; and
the end of the second rod is urged toward a top of the second slot by a second biasing member.

9. The retriever according to claim 6, wherein the end of the first rod is spaced from the end of the second rod by a slide plate arranged on one side of the scraper plate.

10. The retriever according to claim 1, wherein:
a bottom portion of the scraper plate is bent relative to an upper portion of the scraper plate; and
a bottom edge of the bottom portion is closer to the opening than a top edge of the bottom portion.

11. The retriever according to claim 1, wherein:
the retriever further includes a channel extending along a length of the arm;
a first end of the channel is connected to the container such that an interior of the channel connects to the interior of the container; and
a second end of the channel includes a retrieval opening that provides access to the interior of the channel.

12. A funnel retriever configured to retrieve an object from a surface, the funnel retriever including:
an elongated arm having a first end and a second end opposite from the first end;
a funnel arranged at the first end of the arm and having a first opening and a second opening that provide access to an interior of the funnel, the first opening being arranged on a side of the funnel opposite from the first end of the arm, and the second opening being arranged on the elongated arm, the first opening being configured to allow the object to enter the interior, the interior being configured to house the object;
a scraper plate movable between an open position and a closed position, the scraper plate being spaced from the first opening and not contacting the container when in the open position, and the scraper plate contacting the funnel at the first opening when in the closed position, the scraper plate being configured to contact the surface and to pull the object through the first opening and into the interior when moved from the open position to the closed position;
an actuator arranged at the second end of the arm; and
flexible rods operatively connecting the actuator to the scraper plate such that when the actuator is operated, the rods move the scraper plate between the open position and the closed position.

13. The funnel retriever according to claim 12, wherein:
the first opening in the funnel has a square or rectangular cross-sectional shape taken in a plane parallel to the first opening;
the scraper plate has a square or rectangular shape and a size of the scraper plate is equal to or larger than a size of the first opening in the funnel;
when the scraper plate is in the closed position, a flat surface of the scraper plate closes off the first opening.

14. The funnel retriever according to claim 12, wherein:
the retriever further includes a channel extending along a length of the arm;
a first end of the channel is connected to the second opening such that an interior of the channel connects to the interior of the funnel;
a second end of the channel includes a retrieval opening that provides access to the interior of the channel; and
the channel is configured to allow the object housed in the interior of the funnel to be transported therethrough from the first end to the retrieval opening at the second end.

15. The funnel retriever according to claim 12, wherein:
the rods extend from a flat surface of the scraper plate, towards the first opening, through two sets of holes in the funnel, and are operatively connected to the actuator;
a first set of holes of the two sets of holes is arranged in side walls of the funnel;
a second set of holes of the two sets of holes is arranged in front tabs, which extend from an edge of the first opening of the funnel and into the first opening;
the rods are movable axially through the two sets of holes; and
the rods are movable in an up and down direction in the second set of holes.

16. The funnel retriever according to claim 15, further including a slide plate in contact with the scraper plate and spacing ends of the rods from one another.

17. The funnel retriever according to claim 15, wherein:
the rods are operatively connected to slots in the scraper plate;
the rods are vertically moveable along lengths of the slots; and
the rods are not moveable axially with respect to the slots.

18. The funnel retriever according to claim 17, wherein:
the scraper plate is only partially rotatable about an axis; and
the axis is parallel to a width of the scraper plate.

19. The funnel retriever according to claim 17, further including biasing members that urge the rods toward tops of the slots.

20. The funnel retriever according to claim 12, wherein a bottom portion of the scraper plate is bent at a bend relative to an upper portion of the scraper plate such that when the scraper plate is in the closed position, a bottom edge the bottom portion is closer to the first opening than the bend.

* * * * *